United States Patent [19]

Uchida

[11] Patent Number: 5,131,668

[45] Date of Patent: Jul. 21, 1992

[54] STEEL LAMINATE GASKET WITH SEAL PROTECTING MEMBER

[75] Inventor: Tatsuro Uchida, Tokyo, Japan

[73] Assignee: Ishikawa Gasket Co., Ltd., Tokyo, Japan

[21] Appl. No.: 698,707

[22] Filed: May 13, 1991

Related U.S. Application Data

[63] Continuation-in-part of Ser. No. 302,535, Jan. 26, 1989, Pat. No. 5,082,298.

[51] Int. Cl.$^5$ ............................................. F16J 15/08
[52] U.S. Cl. .............................. 277/235 B; 277/180; 277/236
[58] Field of Search .................. 277/235 B, 180, 236, 277/235 R, 232

[56] References Cited

U.S. PATENT DOCUMENTS

| | | | |
|---|---|---|---|
| 1,788,041 | 1/1931 | Balfe | 277/235 B |
| 1,853,175 | 4/1932 | Oven | 277/235 B |
| 3,567,234 | 3/1971 | Skrycki | 277/235 B |

FOREIGN PATENT DOCUMENTS

| | | | |
|---|---|---|---|
| 0320057 | 9/1929 | United Kingdom | 277/235 B |
| 1549200 | 7/1979 | United Kingdom | 277/235 B |
| 2226371 | 6/1990 | United Kingdom | 277/235 B |

Primary Examiner—William A. Cuchlinski, Jr.
Assistant Examiner—Daniel G. DePumpo
Attorney, Agent, or Firm—Kanesaka and Takeuchi

[57] ABSTRACT

A steel laminate gasket of the invention is installed in an internal combustion engine having at least one fluid hole and a plurality of bolt holes therein. The gasket basically comprises first and second plates for constituting the steel laminate gasket, and includes holes corresponding to the fluid hole and the bolt holes. A sealing device is formed around the fluid hole for sealing therearound when the gasket is tightened. At least one seal protecting member is integrally formed with the second plate. The seal protecting member extends from the second plate and is turned near the bolt hole to pile together with the first and second plates adjacent the sealing device. When the gasket is tightened, a part of the tightening pressure applied by the bolts is supported by the seal protecting member to thereby provide moderate tightening pressure to the sealing device.

10 Claims, 1 Drawing Sheet

STEEL LAMINATE GASKET WITH SEAL PROTECTING MEMBER

CROSS REFERENCE TO RELATED APPLICATION

This is a continuation in part application of Ser. No. 302,535 filed on Jan. 26, 1989 now U.S. Pat. No. 5,082,298.

BACKGROUND OF THE INVENTION AND RELATED ART STATEMENT

The present invention relates to a steel laminate gasket with a seal protecting member for protecting creep relaxation of sealing means formed around a hole of the engine.

A gasket is installed between two engine parts to seal areas around holes of the engine parts. In order to securely seal around the holes, the gasket is provided with sealing means around the holes, which provides high surface pressure when the gasket is tightened.

When an engine operates, the engine together with the gasket vibrates. Although the engine parts are securely tightened by bolts, when the engine vibrates, the gasket vibrates or is compressed repeatedly in accordance with vibration of the engine. Especially, the outer periphery of the engine vibrates severely.

In a cylinder head gasket, since bolts are arranged to securely and equally compress sealing means around cylinder bores, the sealing means around the cylinder bores are not substantially damaged by vibration of the engine. However, other holes, such as water holes and oil holes, are not equally compressed by the bolts, so that the sealing means around the other holes are liable to be damaged.

When the gasket is used for a long period of time, creep relaxation may occur at the sealing means around the other holes to thereby cause leakage of fluid.

In a steel laminate gasket, in case one of plates is provided with a bead around a hold to be sealed, a pressure regulation plate may be situated outside the bead so that the bead is not completely compressed when the gasket is tightened.

However, there is no means for partly changing surface pressure around a bolt when a gasket is tightened.

Accordingly, one object of the present invention is to provide a steel laminate gasket, which can partly change surface pressure around a bolt when a gasket is tightened.

Another object of the invention is to provide a steel laminate gasket as stated above, which can regulate surface pressure around a hole to be sealed and prevent creep relaxation of sealing means around the hole.

A further object of the invention is to provide a steel laminate gasket, which can be easily and economically manufactured.

Further objects and advantages of the invention will be apparent from the following description of the invention.

SUMMARY OF THE INVENTION

A steel laminate gasket of the invention is installed in an internal combustion engine having at least one fluid hole and a plurality of bolt holes therein.

The gasket is basically formed of first and second plates piled together for constituting the steel laminate gasket. One or more middle plates may be installed between the first and second plates.

The first and second plates include holes corresponding to the fluid hole and bolt holes of the engine. The gasket further includes sealing means for sealing around the fluid hole of the engine when the gasket is tightened, and at least one seal protecting member integrally formed with one of the first and second plates. The seal protecting member may extend from the second plate and be turned near the bolt hole to pile together with the first and second plates adjacent the sealing means.

When the gasket is tightened, a part of tightening pressure applied by the bolt is supported by the seal protecting member. Accordingly, moderate tightening pressure can be applied to the sealing means.

Especially, the seal protecting member of the present invention is useful in case the fluid hole is arranged near the bolt hole. Namely, in case the fluid hole is located near the bolt hole, when the gasket is tightened, large tightening pressure is always applied to the fluid hole. Therefore, sealing means around the fluid hole is liable to be damaged.

In the present invention, however, since the seal protecting member is formed near the bolt hole at a side of the sealing means, a part of the tightening pressure is supported by the seal protecting member. Therefore, high tightening pressure is not directly applied to the sealing means, so that the sealing means is sufficiently protected.

The seal protecting member may be integrally formed with the second plate near one of holes for bolts. The hole of the first plate, which communicates with the hole with the seal protecting member when the gasket is assembled, has a diameter larger than the diameter of the bolt of the engine.

When the gasket is assembled, the seal protecting member extends from the second plate and passes through the hole with the large diameter of the first plate. The seal protecting member is turned outside the first plate or orient toward the sealing means. In this structure, the gasket is also connected together by the seal protecting member.

The thickness of the plates of the gasket on the seal protecting member is thicker than the total thickness of the plates of the gasket at the sealing means, but thinner than distance between outer surfaces of the gasket at the sealing means before the gasket is compressed. Therefore, when the gasket is tightened, the sealing means is partly compressed but not completely compressed by the seal protecting member.

Preferably, the seal protecting member is formed near a water hole or an oil hole. When the fluid hole is located near the outer periphery of the gasket, a second seal protecting member may be formed on the outer periphery of the gasket.

DETAILED DESCRIPTION OF PREFERRED EMBODIMENTS

Figure 1:
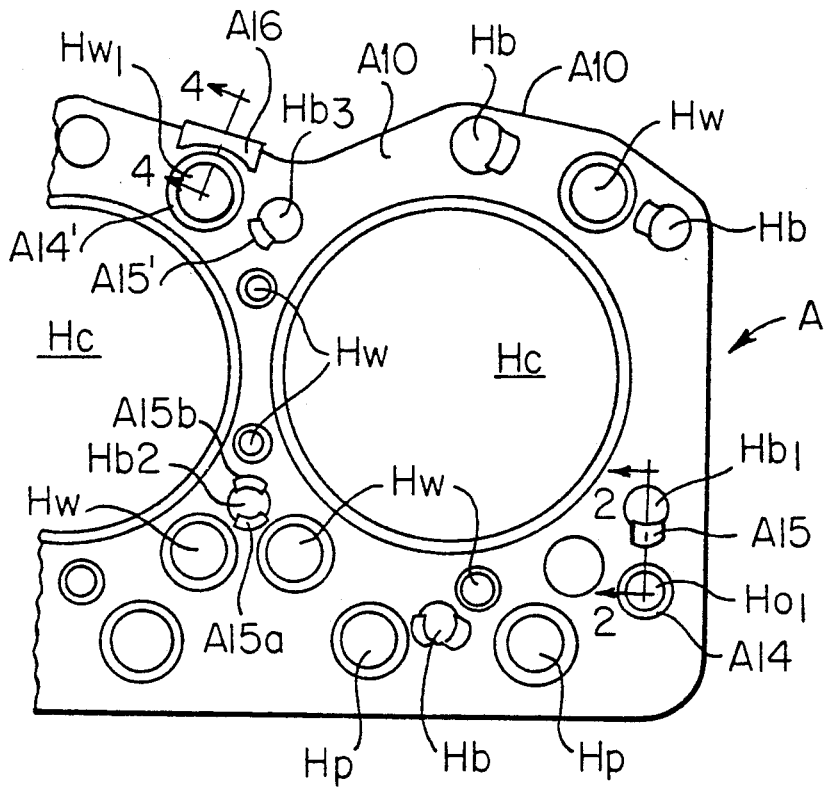
FIG. 1 is a partial plan view of a first embodiment of a steel laminate gasket of the invention.
Figure 2:
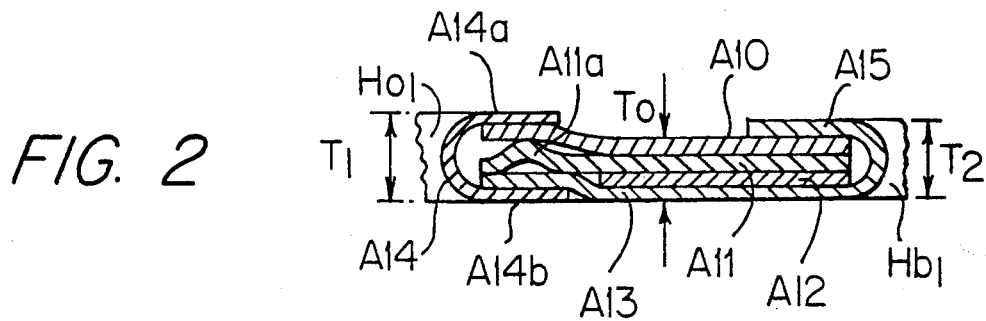
FIG. 2 is an enlarged section view taken along line 2—2 in FIG. 1.
Figure 4:
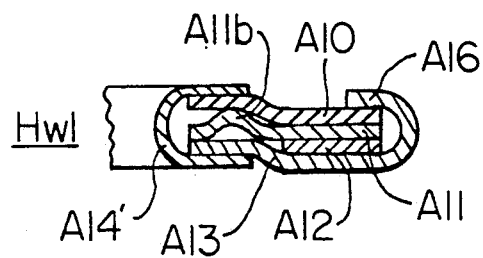
FIG. 4 is an enlarged section view taken along a line 4—4 in FIG. 1.

Referring to FIGS. 1, 2 and 4, a first embodiment A of a steel laminate gasket of the present invention is shown. The gasket A is a cylinder head gasket and includes a plurality of cylinder bores Hc, water holes Hw, Hw1, oil holes Ho, Ho1, push rod holes Hp, and bolt holes Hb, Hb1-Hb3, as in the conventional gasket.

As shown in FIG. 2, the gasket A comprises an upper plate A10, middle plates A11, A12 and a lower plate A13. The middle plate A11 includes a bead A11$a$ around the oil hole Ho1 for sealing around the same. A grommet A14 is installed around the oil hole Ho1 so that flanges A14$a$, A14$b$ are located outside the upper and lower plates A10, A13.

The lower plate A13 is provide with a seal protecting plate A15, which extends inside the bolt hole Hb1 and is turned to be located above the upper plate A10. The seal protecting plate A15 orients or extends toward the oil hole Ho1 above the upper plate A10.

Namely, the lower plate A13 has a hole for the bolt, which has a size substantially the same or slightly larger than the bolt. On the other hand, the upper and middle plates A10, A11, A12 have holes larger than the bolt so that the seal protecting plate A15 extends along the bolt. The seal protecting plate A15 passing near the bolt is turned and placed above the upper plate A10.

The height T2 of the gasket at the seal protecting plate A15, i.e. total thickness of the plates A10, A11, A12, A13 and A15, is higher than the thickness T0 outside the seal protecting plate A15, i.e. total thickness of the plates A10, A11, A12 and A13. However, the height T2 is shorter than the height T1 at an area of the bead A11$a$ before the bead A11$a$ is compressed, i.e. total thickness of the upper and lower flanges A14$a$, A14$b$ and the plates A10, A11 and A13 and the height of the bead A11$a$. The height T1 becomes equal to the height T2 when the gasket is compressed.

When the gasket A is tightened, the bead A11$a$ around the oil hole Ho1 is at first compressed. However, since the seal protecting plate A15 is located adjacent to the oil hole Ho1, the bead A11$a$ is compressed to the height substantially equal to the height T2. The bead A11$a$ is not completely compressed even if the gasket A is strongly tightened by the bolts. Since the bead A11$a$ is not completely compressed at all times, creep relaxation of the bead A11$a$ does not substantially happen in a long usage.

In the present invention, the seal protecting plate A15 extends only in the direction to a portion where the high tightening pressure should not be applied. Therefore, when the gasket is tightened, the seal protecting plate A15 does not affect other sealing, such as around the cylinder bore Hc.

As shown in FIG. 1, if there are several water holes Hw near the bolt hole Hb, two seal protecting plates A15$a$, A15$b$ may be formed. If necessary, the seal protecting plate may be formed around the entire bolt hole Hb. Needless to say, the seal protecting plate need not be formed around all the bolt holes. The seal protecting plate may be formed if required.

Figure 3:
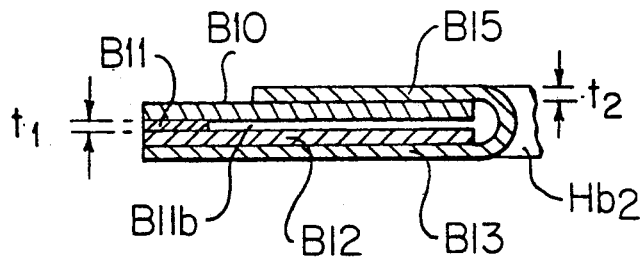
FIG. 3 is an enlarged section view, similar to FIG. 2, for showing a second embodiment of the invention.

FIG. 3 shows a second embodiment B of a steel laminate gasket of the invention. The gasket B comprises an upper plate B10, middle plates B11, B12 and a lower plate B13 with a seal protecting plate B15, as in the gasket A.

The seal protecting plate B15 is formed near a bolt hole Hb2. Although it is not shown in FIG. 3, the middle plate B11 has a bead around a water hole, and a grommet is installed around the water hole, as in the gasket A.

In the gasket B, the thickness t1 of the middle plate B11 is thinner than the thickness t2 of the seal protecting plate B15 or the lower plate B13. Also, the middle plate B11 has a notch B11$b$ located under the seal protecting plate B15, which is slightly larger than a size of the seal protecting plate B15.

Therefore, when the gasket B is tightened, the seal protecting plate B15 is pushed into the notch B11$b$, but an upper surface of the seal protecting plate B15 slightly projects beyond an upper surface of the upper plate B10. Accordingly, the seal protecting plate B15 can receive a part of the tightening pressure by the bolts.

As exemplified in the gasket B, in case the thickness of the plate B11 or the seal protecting plate B15 is changed, or a notch is formed under the seal protecting plate, pressure applied to the sealing means around the water hole can be regulated.

FIG. 4 shows another example of the present invention, wherein an outer seal protecting plate A16 and a seal protecting plate A15' are formed around the water hole Hw1. Namely, a bead A11$b$ is formed on the middle plate A11, and a grommet A14' is installed around the water hole Hw1, as in the oil hole Ho1.

The seal protecting plate A15' is formed around the bolt hole Hb3, as in the seal protecting plate A15. The outer seal protecting plate A16 extends from the lower plate A13 and is turned at an outer periphery of the gasket to be situated above the upper plate A10.

In this example, the water hole Hw1 is located close to the outer periphery of the gasket A, and the seal protecting plate A15' is formed near the bead A11$b$. In order to equally protect the bead A11$b$, the outer seal protecting plate A16 is formed.

When the gasket is tightened, the outer seal protecting plate A16 and the seal protecting plate A15' partly support the tightening pressure by the bolts. Accordingly, creep relaxation of the bead A11$b$ is substantially prevented.

In FIG. 1, one outer seal protecting plate A16 is shown, but if required, the same kind of the outer seal protecting plate may be formed along the outer periphery of the gasket.

In the present invention, the seal protecting plate is located adjacent to the bolt hole to partly support or receive the tightening pressure by the bolts. Accordingly, an area to which small tightening pressure should be applied can be sealed at a required pressure. Creep relaxation of seal means is effectively prevented.

While the invention has been explained with reference to the specific embodiments of the invention, the explanation is illustrative and the invention is limited only by the appended claims.

What is claimed is:

1. A steel laminate gasket for an internal combustion engine having at least one fluid hole and a plurality of bolt holes therein, comprising, first and second plates piled together for constituting a steel laminate gasket, said first plate having at least one first hole and a plurality of second holes corresponding to the fluid hole and the bolt holes of the engine respectively, said second plate having at least one third hole and a plurality of fourth holes corresponding to the fluid hole and the bolt holes of the engine respectively, sealing means formed around at least one of the first and third holes for sealing around the fluid hole of the engine when the gasket is tightened, and at least one seal protecting member integrally formed with the second plate, said seal protecting member extending from the second plate, passing through one of the second holes and being turned only at a portion near the sealing means without turning entirely around the second hole that the seal protecting member passes to pile over the first and second plates adjacent the sealing means, total thickness of the plates at the seal protecting member being thicker than the total thickness of the plates at the sealing means so that when the gasket is tightened, a part of tightening pressure applied by the bolts is supported by the seal protecting member to thereby provide moderate tightening pressure to the sealing means.

2. A steel laminate gasket according to claim 1, wherein said seal protecting member is formed around one of the fourth holes of the second plate, said second hole, which communicates with the fourth hole with the seal protecting member when the gasket is assembled, having a diameter larger than a diameter of the bolt hole of the engine, said seal protecting member extending from the second plate, passing through the second hole with the large diameter and being placed outside the first plate.

3. A steel laminate gasket according to claim 2, wherein a distance between outer surfaces of the gasket at the seal protecting member is thinner than a distance between the outer surfaces of the gasket at the sealing means before the gasket is compressed.

4. A steel laminate gasket according to claim 3, wherein said seal protecting member extends toward the sealing means.

5. A steel laminate gasket according to claim 4, wherein said fluid hole is a water hole of the engine.

6. A steel laminate gasket according to claim 5, further comprising at least one middle plate situated between the first and second plates.

7. A steel laminate gasket according to claim 6, wherein said middle plate includes a notch corresponding to the seal protecting member, thickness of the sealing protecting member being greater than that of the middle plate so that the seal protecting member projects outwardly from a surface of the gasket for a difference of the thickness between the seal protecting member and the middle plate when the gasket is tightened.

8. A steel laminate gasket according to claim 3, wherein said second plate includes a plurality of seal protecting members around one fourth hole.

9. A steel laminate gasket according to claim 2, wherein said fluid hole is located near an outer periphery of the gasket, said second plate having a second seal protecting member at the outer periphery of the gasket, said second seal protecting member extending from the second plate and being turned to be disposed on the first plate adjacent the fluid hole to protect the sealing means near the outer periphery of the gasket.

10. A metal laminate gasket for an internal combustion engine having at least one cylinder bore, a plurality of bolt holes and at least one fluid hole situated near one of the bolt holes, said gasket consisting essentially of metal and comprising, first and second metal plates piled together for constituting a metal laminate gasket and having holes corresponding to the cylinder bore and the fluid hole, said first plate having a first bolt hole situated near the fluid hole and a plurality of second bolt holes situated away from the fluid hole, said first bolt hole having a diameter greater than diameters of the second bolt holes, said second plate having a third bolt hole situated under the first bolt hole and a plurality of fourth bolt holes situated under the second bolt holes, sealing means formed on the gasket around the fluid hole of the engine for sealing therearound when the gasket is tightened, and at least one seal protecting member integrally formed with the second plate, said seal protecting member extending from the second plate near the third bolt hole, passing through the first bolt hole and being turned in a direction near the sealing means without entirely turning around the first bolt hole to thereby pile over the first and second plates adjacent the sealing means, total thickness of the plates at the seal protecting member being thicker than total thickness of the plates at the sealing means so that when the gasket is tightened, a part of tightening pressure applied by the bolts is supported by the seal protecting member to thereby provide moderate tightening pressure to the sealing means without reducing tightening pressure to the cylinder bore.

* * * * *